(12) United States Patent
Mazzoldi et al.

(10) Patent No.: US 10,853,729 B2
(45) Date of Patent: Dec. 1, 2020

(54) OPTIMIZATION LEARNS FROM THE USER

(71) Applicant: Autodesk, Inc., San Rafael, CA (US)

(72) Inventors: Florencio German Mazzoldi, Burnsville, MN (US); Carlos Edel Olguin Alvarez, San Francisco, CA (US); Malte Sebastian Tinnus, Berkeley, CA (US)

(73) Assignee: Autodesk, Inc., San Rafael, CA (US)

( * ) Notice: Subject to any disclaimer, the term of this patent is extended or adjusted under 35 U.S.C. 154(b) by 698 days.

(21) Appl. No.: 14/839,778

(22) Filed: Aug. 28, 2015

(65) Prior Publication Data

US 2017/0061319 A1    Mar. 2, 2017

(51) Int. Cl.
   *G06N 3/12*    (2006.01)

(52) U.S. Cl.
   CPC ................................. *G06N 3/126* (2013.01)

(58) Field of Classification Search
   None
   See application file for complete search history.

(56) References Cited

U.S. PATENT DOCUMENTS

| | | | | |
|---|---|---|---|---|
| 7,603,326 B2* | 10/2009 | Bonabeau | ............... | G06N 3/126 706/13 |
| 2002/0099929 A1* | 7/2002 | Jin | ......................... | G06Q 10/04 712/220 |
| 2004/0186668 A1* | 9/2004 | Gillet | ..................... | G06N 3/126 702/19 |
| 2010/0199257 A1* | 8/2010 | Biggerstaff | ............. | G06F 8/456 717/104 |
| 2011/0214076 A1* | 9/2011 | Cui | ........................... | G06F 8/38 715/762 |
| 2014/0337779 A1* | 11/2014 | Davis | ..................... | G06F 3/0484 715/771 |
| 2014/0344013 A1* | 11/2014 | Karty | .................. | G06Q 30/0201 705/7.29 |
| 2015/0128102 A1* | 5/2015 | Perry | .................. | G06F 17/5072 716/137 |

* cited by examiner

*Primary Examiner* — Robert A Cassity
*Assistant Examiner* — Tsu-Chang Lee
(74) *Attorney, Agent, or Firm* — Womble Bond Dickinson (US) LLP

(57) ABSTRACT

A method and apparatus of a device that incorporates a user preference into a multi-objective optimization while the multi-objective optimization is running is described. In an exemplary embodiment, the device generates a first plurality of intermediate designs based on optimizing a plurality of variable values corresponding to the multiple dimensions of the multi-objective optimization. In addition, each of the first plurality of intermediate designs includes a corresponding weight. Furthermore, the device outputs the first plurality of intermediate designs. The device additionally receives a preference indicator for a selected one of the intermediate designs, where a user inputs the preference indicator while the multi-objective optimization is running. The device further adjusts the corresponding weight of the selected one of the first plurality of intermediate designs based on the preference indicator. In addition, the device generates a second plurality of intermediate designs using the adjusted corresponding weight of the selected one of the first plurality of intermediate designs.

21 Claims, 7 Drawing Sheets

OPTIMIZATION LEARNS FROM THE USER

FIELD OF INVENTION

This invention relates generally to computational technology and more particularly to allowing the user to affect the optimization of a system midstream.

BACKGROUND OF THE INVENTION

Single objective optimization problems define a fitness function that can be used to evaluate a particular design against another. Running one of those problems involves evaluating a number of designs against their fitness function and choosing the one that yields the best result in that function. In contrast, multi-objective optimization problems define multiple objectives for a design problem. Using similar techniques than single-objective optimizations, the process involves exploring a number of designs. But in the case of multi-objective problems, each design is ranked against all the objectives. In many of these problems, there are tradeoffs necessary among the different objectives. For instance, an optimization problem may be modifying some geometry looking for a design that minimizes weight while maximizing structural integrity.

In such a problem, there is not one single solution. There are many designs that offer different tradeoffs between the objectives. For example, a chemist may be interested in a possible target molecules with optimal properties for melting point, toxicity, and protein affinity. However, many of these problems also involve qualitative objectives that can only be measured by the user. For example, certain functional groups are easy or difficult to synthesize and wish to be encouraged or avoided.

Some optimization problems require the traversal of a very large design space. Since exploring the design space involves the use of vast amounts of computational resources, it is in the user's best interest to explore the design space efficiently.

SUMMARY OF THE DESCRIPTION

A method and apparatus of a device that incorporates a user preference into a multi-objective optimization while the multi-objective optimization is running is described. In an exemplary embodiment, the device generates a first plurality of intermediate designs based on optimizing a plurality of variable values corresponding to the multiple dimensions of the multi-objective optimization. In addition, each of the first plurality of intermediate designs includes a corresponding weight. Furthermore, the device outputs the first plurality of intermediate designs. The device additionally receives a preference indicator for a selected one of the intermediate designs, where a user inputs the preference indicator while the multi-objective optimization is running. The device further adjusts the corresponding weight of the selected one of the first plurality of intermediate designs based on the preference indicator. In addition, the device generates a second plurality of intermediate designs using the adjusted corresponding weight of the selected one of the first plurality of intermediate designs.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
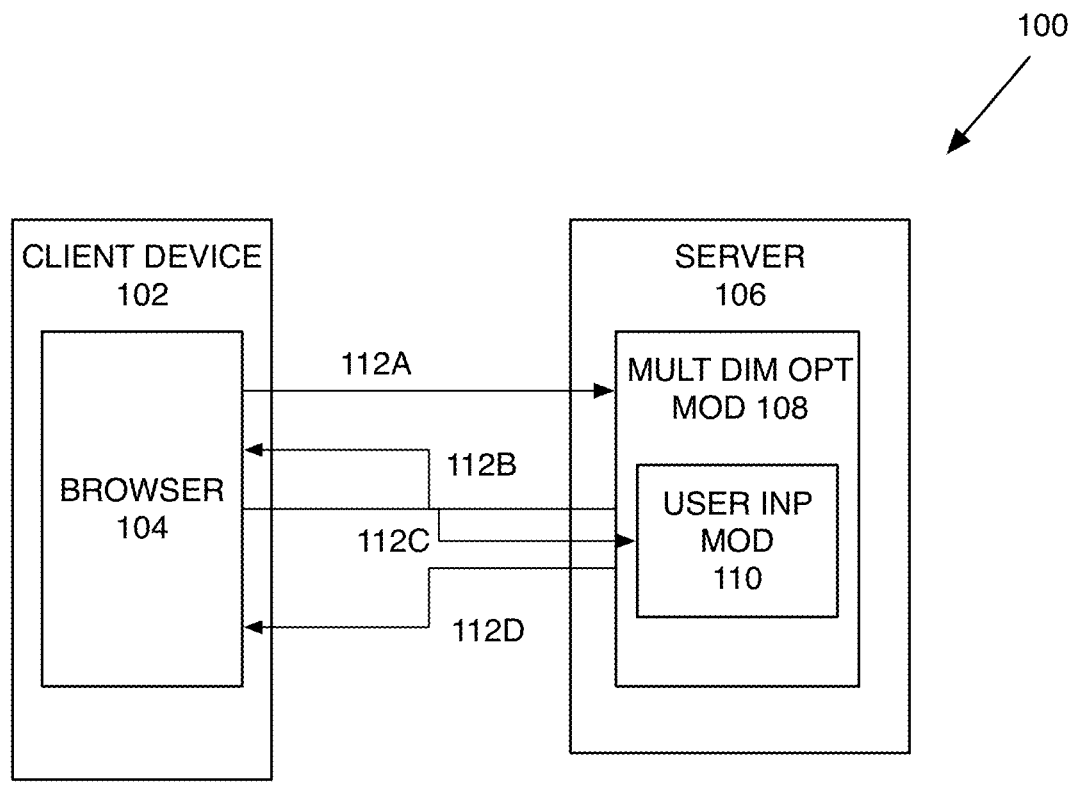
FIG. 1 is a block diagram of one embodiment of a system that computes optimizations/simulations and outputs results to a client device.

A method and apparatus of a device that incorporates a user preference into a multi-objective optimization while the multi-objective optimization is running is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that incorporates a user preference into a multi-objective optimization while the multi-objective optimization is running is described. In one embodiment, the device receives input for the multi-objective optimization, such as input variables, target variables, bounds on the target variables (e.g., acceptable lower and upper bounds for one or more of the target variables, and/or a target for one or more of the target variables), which programs or algorithms to use to calculate values for each variable and design, and any other types of inputs (e.g., an initial target molecule). The device starts the multi-objective optimization by generating different sets of designs for the different dimensions.

Periodically, and in one embodiment, the device outputs a set of intermediate designs, so that the user can view these designs through a user interface while the multi-objective optimization is the next set of designs. In one embodiment, the user views the intermediate designs and the associated variable values for each of the designs or set of designs. For example and in one embodiment, the user can view the intermediate designs via X-Y chart or a parallel coordinate chart that plots the variable values versus the different intermediate designs. In one embodiment, the user can give a preference indicator for one or more of the intermediate design. For example and in one embodiment, the user can indicate the one of the intermediate is "liked" or "disliked." A "like" means that the user would prefer that multi-objective optimization explores the design space around the "liked" design. Alternatively, if the user "dislikes" a design, then the user is indicating that the multi-objective optimization should not explore this space for this design or explore this design space less than if this intermediate design was not marked as a "dislike."

The device receives the user's preference indicators for the one or more intermediate design and uses this input to adjust the weights of these intermediate designs. In one embodiment, if the user "liked" an intermediate design, the device increases the weight on this design. With an increased weight, the device will explore more of the space around the "liked" design. For example and in one embodiment, if the molecule melatonin is a "liked" design, the device will create more mutations of melatonin in the multi-objective optimization than if this molecule not "liked" (e.g., "disliked" or no preference given). In another embodiment, if the user "disliked" an intermediate design, the device decreases the weight on this design. With a decreased weight, the device will explore less (or none) of the space around the "liked" design. For example and in one embodiment, if the molecule agomelatine is a "disliked" design, the device will create less or no mutations of agomelatine in the multi-objective optimization than if this molecule not "disliked" (e.g., "liked" or no preference given). With the adjusted weights, the device continues the multi-objective optimization. Thus, the device performs the optimization concurrently with the adjusting of the intermediate designs based on the user input.

FIG. 1 is a block diagram of one embodiment of a system 100 that computes optimizations/simulations and outputs results to a client device 102. In FIG. 1, a client device 102 provides input for a multi-objective optimization to the server 106. The server 106 receives the input from the client device 102, performs the multi-objective optimization, outputs intermediate results to the client device 102, receives input from the client device 102 during the multi-objective optimization, and completes multi-objective optimization. In one embodiment, the client device 102 or server 106 can independently be personal computer, laptop, server, mobile device (e.g., smartphone, laptop, personal digital assistant, music playing device, gaming device, etc.), and/or any device capable requesting and/or displaying a query. In one embodiment, each of the client device 102 and server 106 can independently be a physical or virtual device. While in one embodiment, the system 100 is illustrated with a single client 102 and server 106, in alternate embodiments, there are several servers (not illustrated) serving the client 102 to evaluate the designs concurrently. For example and in one embodiment, multiple servers can be arranged as a cloud to evaluate the sets of designs for the client 106. In another embodiment, the client 102 and server 106 are part of the same machine.

Client device 102 further includes a browser 104. In one embodiment, the browser 104 is a web browser that is capable of making web requests to the server 106 and receiving results from those requests for display on the client device 102. In addition, the server 106 further includes a multi-objective optimization module 108. In this embodiment, the multi-objective optimization module 108 is a program running on the server 106 that can perform a multi-objective optimization. In one embodiment a multi-objective optimization is an optimization that tries to optimize based on multiple different types of variables. For example and in one embodiment, for chemical multi-objective optimization, the different objectives can be chemical properties (e. g., melting point, toxicity, affinity,
absorption, distribution, metabolism, and excretion, synthesizeability, cost, and/or other types of objectives. With a multi-objective optimization, it can be difficult to find a best solution. For example and in one embodiment, a molecule may have a good value for one of the properties, but a poor value for another one of the properties. In this example, the molecule may have a good melting point and toxicity, but may have a poor affinity for protein of interest. Thus, depending on the types of variables that a scientist may wish to optimize for, a multi-objective optimization may be difficult to find a single "best" solution or a family of "best" solutions.

One embodiment, the multi-objective optimization module 108 includes a user input module 110, which is a computational module that is used to receive and incorporate preference feedback from the user via the browser model for into a multi-objective optimization computation. For example and in one embodiment, as the multi-objective optimization module 108 is performing this multi-objective optimization, the multi-objective optimization module 108 will output intermediate designs to the browser 104. In response, the user may view these intermediate designs in the browser 104 and indicate a preference (e.g., like or dislike) for one or more of these intermediate designs. The browser 104 receives these preference indications and sends the preference indications to the multi-objective optimization module 108. The user input module 110 incorporates the preference indications into the multi-objective optimization, which continues to run using the incorporated preference indications.

In one embodiment, the user logs in to the server 106 via the browser 104 (112A). After logging the server 106, the user would set up the multi-objective optimization by inputting parameters that are to be used for this multi-objective optimization. In one embodiment, each of the dimensions in the optimization can be one of the variables that the user indicates that are to be optimized. For example and one embodiment, each of the different variables can be a different type of chemical property the user is interested in optimizing. These chemical properties can be bulk properties, such as melting point, boiling point, toxicity, affinity to a particular protein or molecule, or another type of bulk chemical property. Alternatively, the variable can be a molecular property, such as energy, confirmation, absorption, distribution, metabolism, excretion, synthesizability, cost. While in one embodiment, a browser 104 is illustrated as the user interface for the optimization, in alternate embodiments, a different type of user interface can be user.

The type of calculation that is performed by the multi-objective optimization can be a type of calculation that iterates through multiple generations or iterations to arrive at a set of designs. In one embodiment, a design is a possible solution for the multi-objective optimization. In this embodiment, there can be intermediate designs, which are designs that are computed by the multi-objective optimization before the multi-objective optimization completes. The intermediate designs can be intermediate solutions determined by the multi-objective optimization. In this embodiment, the intermediate designs can be a final design or can be an intermediate design used as a basis for other designs. In one embodiment, the multi-objective optimization can be multiple types of calculations, where there is a calculation of one or more values for that design. For example and in one embodiment, if there is a multi-objective for a target molecule that optimizes over melting point, toxicity, and protein affinity, there can be separate calculations for melting point, toxicity, and protein affinity for each design. The designs are weighted based on the resulting values. These designs are then used as a basis to evolve a new generation of designs. In one embodiment, the weighting of the designs is accomplished by using a Pareto surface. The multi-objective optimization receives the variable values for those designs and computes a new set of designs based on a multi-objective optimization.

If the multi-objective optimization is optimizing for target molecules using variables melting point, toxicity, and affinity for a particular protein, in each iteration of the multi-objective optimization, the optimization receives a set of designs and computes melting point, toxicity, and protein affinity for each of those designs. Using the computed variables, the multi-objective optimization mutates one or more atoms in each of the designs to come up with a new set of designs. Each of these new set of designs can be considered a new generation of designs. For example and in one embodiment, if each of the target molecules is input using SMILES chemical input, the multi-objective optimization would mutate one or more of the atoms in the SMILES chemical input string. By mutating an atom in the input string, the multi-objective optimization is exploring the space of possible molecules around the molecule represented by the chemical input string. Which mutation is chosen would be based on the variables computed by the multi-objective optimization.

In one embodiment, during the multi-objective optimization, the optimization generates a number of intermediate design sets. For each of these intermediate design sets or alternatively every $N^{th}$ generation of intermediate design sets, the server 106 would send the intermediate design set designs and corresponding variable values to the browser 104 (112B). In this embodiment the browser 104 would display the intermediate set of designs and variable values for the user to review. The intermediate design set can be displayed in a number of different forms. In one embodiment, the browser 104 presents the intermediate designs in an X-Y chart, where the X and Y axes are the variable values and the points on the chart represent one of the intermediate designs or a family of intermediate designs. In this embodiment, the user can click on one of the points to either drill down and explore the family of intermediate designs or display the molecule represented by that design. In one embodiment, the user may indicate a preference for the single design or family of designs. In this embodiment, the preference can be a "like" or a "dislike." A "like" indicates that the user wishes the multi-objective optimization module to explore the space around the design or family of designs selected by the user. Alternatively, a "dislike" indicates that the user wishes the multi-objective optimization module to not explore the space around that designer family of design selected by the user. By allowing the user to indicate a preference for one of the designs or a family of designs, the multi-objective optimization module is incorporating feedback into the optimization that will affect the optimization in generating new generations of designs. For example in one embodiment, the user may know that a certain chemical functional group exhibits a good value for a variable that is not included in the calculation and would like the optimization to explore possible designs that incorporate this functional group or functional groups that are similar to it. As the multi-objective optimization runs and these are notices that this functional group is included in one of the intermediate designs, the user would indicate a "like" for those molecules that include this functional group.

In one embodiment, the browser 104 collects these preference indicators for the presented intermediate designs and sends these preference indicators to the server 106 (112C). The multi-objective optimization module 108 receives these preferences, and uses the preference indicators to weight the intermediate designs differently than would be calculated by the multi-objective optimization module 108. In one embodiment, if the user has indicated a "like" for a particular molecule, the multi-objective optimization module 108 would increase the weight used for a design corresponding to that particular molecule. For example and in one embodiment, the multi-objective optimization module 108 would increase the weight used for that design by 50% (or some other positive factor). As another example and in another embodiment, if the user has indicated a "dislike" for a particular molecule, the multi-objective optimization module 108 would decrease the weight used for design corresponding to that particular molecule (e.g., reduce the weight by 50% or some other factor, or set that weight to zero). While in one embodiment, the preference indicator has two values (e.g., like/dislike), in alternate embodiments, the preference indicators can have a different range (e.g., 1 . . . 10, 1 . . . 5, really dislike/like/neutral/like/really like, or some other scale).

Using the re-weighted designs, the multi-objective optimization module 108 continues with the multi-objective optimization. For designs that have an increased weight, the multi-objective optimization module 108 will explore more designs around that space than if this design is not marked as "liked." Alternatively, for designs with reduced or zero weight, the multi-objective optimization module 108 will explore less around that design. The multi-objective optimization module 108 continues computing the optimization until the optimization completes. In one embodiment, by allowing the user to influence the multi-objective optimization while the multi-objective optimization is running, the user is directing the evolution of designs being computed.

This allows the user to input his or her knowledge that may not be captured by the multi-objective optimization.

In one embodiment, the multi-objective optimization can be based on a genetic algorithm, which is a search heuristic that mimics the process of natural selection. In this embodiment, the genetic algorithm selects a set of designs to evolve. The amount of evolution used is based on a weight assigned to each of the designs. The weights can be based on the variable values used in the multi-objective optimization (e.g., melting point, toxicity, protein affinity, etc.). Designs with a better set of variable values will have a larger weight. In one embodiment, the genetic algorithm scores each design based on the variable value(s) of that design and assigns a corresponding weight. The genetic algorithm mutates one or more of the designs to generate new designs. For example and in one embodiment, if each design is a molecule, the genetic algorithm can mutate the module by replacing an atom, multiple atoms, or functional group with another set of atoms or functional group. Designs with higher weights will have more mutations to produce more new designs, whereas designs with lower weights will produce fewer mutated designs (or no new designs). Mutating a design can be thought of exploring the space around that design. In one embodiment, a single design can be mutated to generate multiple new designs. For example and in one embodiment, if a molecule with a hydrogen (e.g., methane) can be mutated with multiple different functions groups in place of that hydrogen to create many different designs (e.g., methyl alcohol, fluoromethane, chloromethane, methylamine, etc.). Alternatively, for an intermediate design that is "disliked" by the user is not used as basis for mutation. In this example, the weight for this "disliked" design can be zero.

In another embodiment, a "liked" design does not have its weight increased. In this embodiment, a "liked" design is added as another objective in the multi-objective design. By adding the "liked" design as an objective, the multi-objective can incorporate this design as a further objective to optimize around. Allowing for the user input during the multi-objective optimization is further described In FIGS. 2-5 below.

Figure 2:
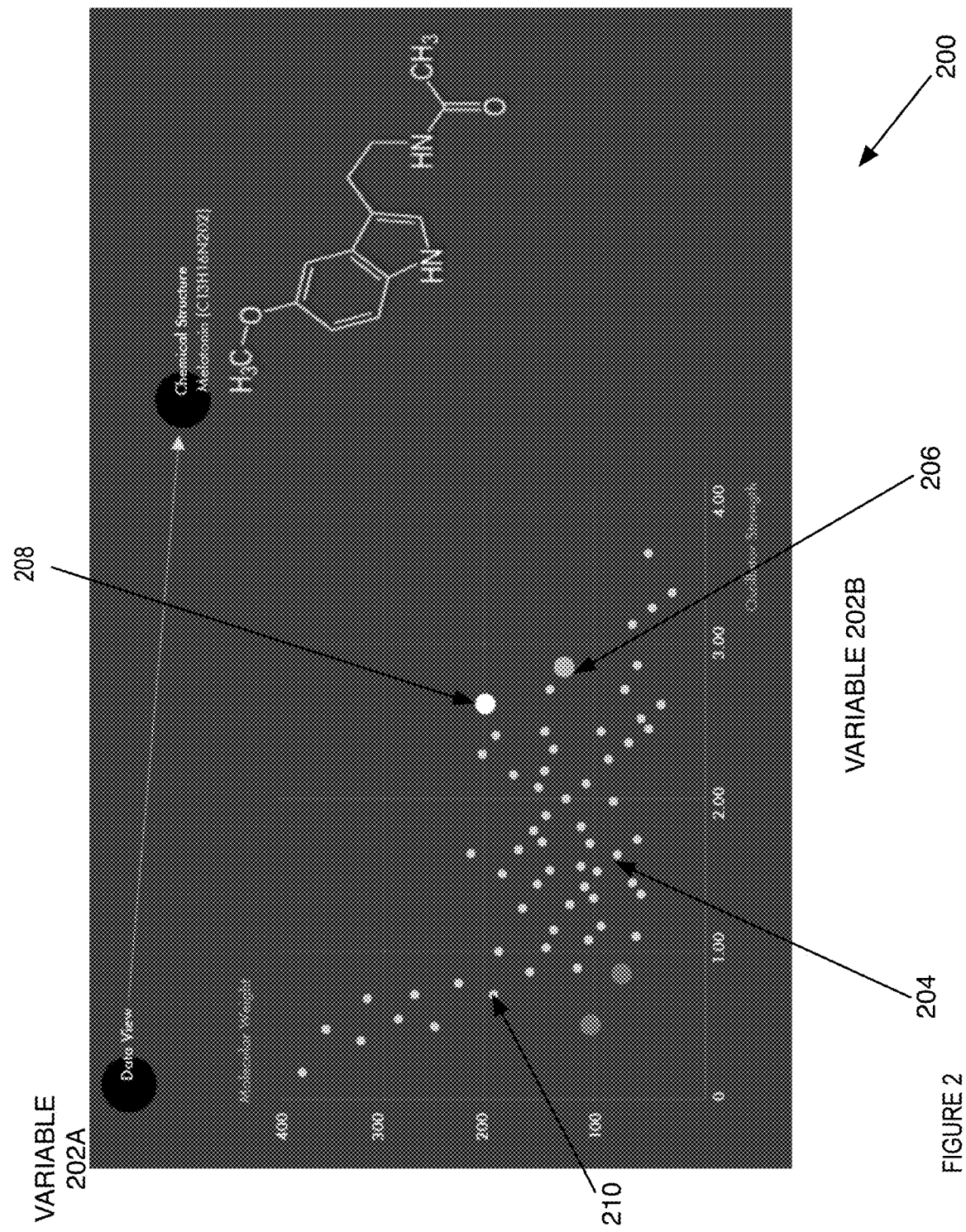
FIG. 2 is an illustration of one embodiment of an X-Y chart for two variables that displays intermediates designs for an optimization.

FIG. 2 is an illustration of one embodiment of an X-Y chart for two variables that displays intermediates designs for an optimization. In FIG. 2, an X-Y chart 200 is illustrated plotting a set of intermediate designs against two variables 202A-B. Each of the dots represented in FIG. 2 can be a single design or family of designs. For example and in one embodiment, dot 204 can represent a particular molecule, or a family of molecules having those valuables for the variables 202A-B. In this embodiment, the X-Y chart 200 is useful to present intermediate designs for an optimization with two objectives (e.g. variables 202A-B), or an optimization that has more than two objectives, but the user wishes to explore the trade-offs between two specific objectives. In one embodiment, larger dots may be used to represent a family of designs, such as dots 206 and 208. In another embodiment, selecting one of these dots, such as dot 204 displays the molecule associated with that dot. For example in one embodiment, selecting dot 210 displays the chemical structure for melatonin.

In addition, and in one embodiment, the X-Y chart 200 can be used by the user to indicate a preference for a single intermediate design or a family of intermediate designs. For example and in one embodiment, the user selects the dot 208 to indicate a "like," which is used by the multi-objective optimization to increase the weight for the design or designs represented by dot 208. In another embodiment, the user selects the dot 206 to indicate a "dislike" which is used by the multi-objective optimization to decrease the weight for the design or designs represented by dot 206.

Figure 3:
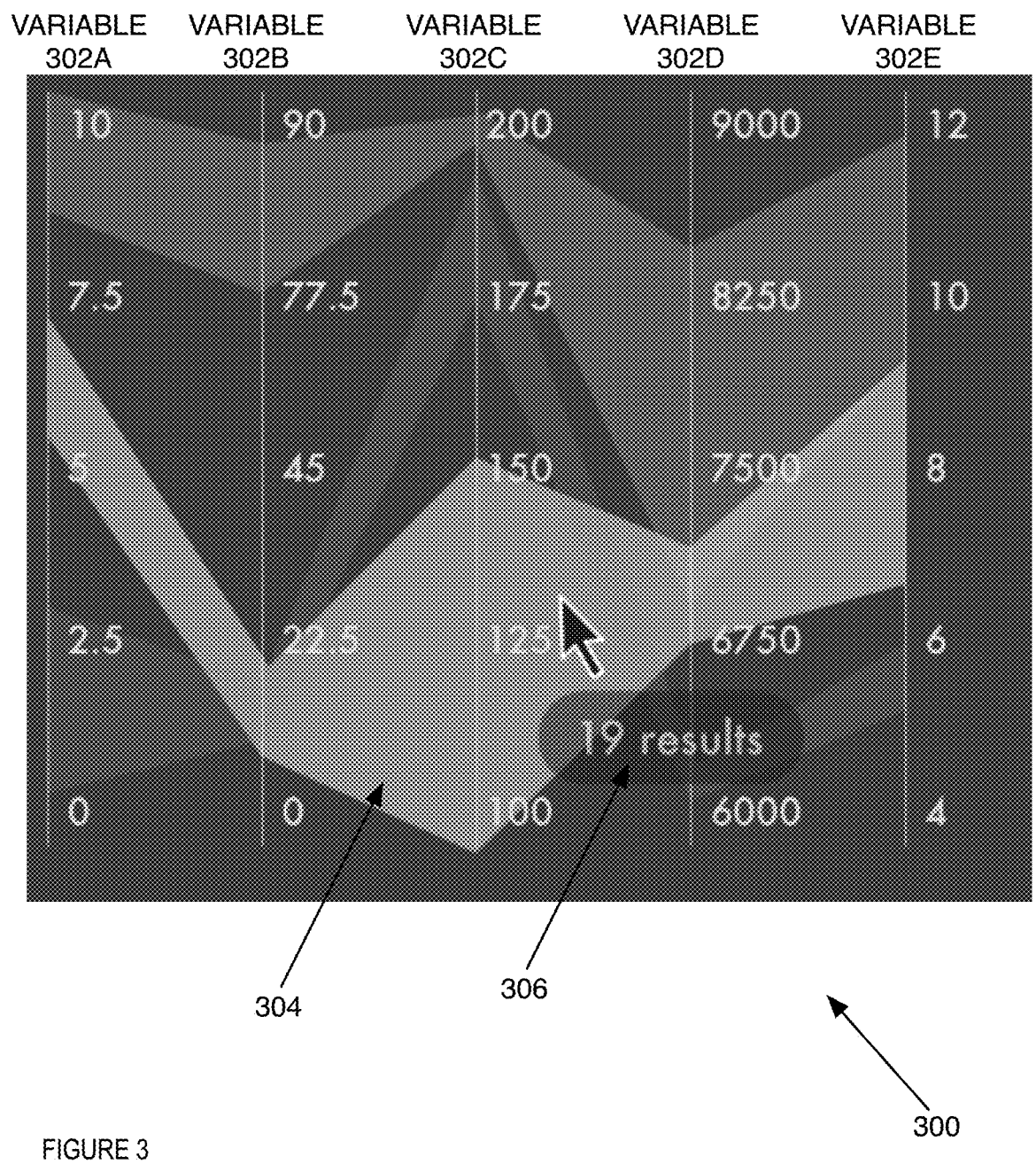
FIG. 3 is an illustration of one embodiment of a parallel coordinate chart for multiple variables that displays intermediates designs for an optimization.

FIG. 3 is an illustration of one embodiment of a parallel coordinate chart 300 for multiple variables that displays intermediates designs for an optimization. In FIG. 3, a parallel coordinate chart 300 is illustrated plotting different bands of intermediate designs against five variables 302A-E. in one embodiment, each of the variables 302A-E has a range of values. These are the range of values for these variables 302A-E that are computed during the multi-objective optimization. For example in one embodiment variable 302A ranges between zero and 10, variable 302B ranges between 0 and 90, variable 302C ranges between 100 and 200, variable 302D range is between 6000 and 9000, and variable 302E ranges between 4 and 12. The bands illustrated in FIG. 3 represent a family of intermediate designs that have variable values within the band illustrated. For example and in one embodiment, band 304 is a band of intermediate designs having values for variables 302A between 5 and 7.5, variable 302B between 10 and 21, variable 302C between 100 and 150, variable 302D between 6750 and 7250, and variable 302E between 6.5 and 9. In one embodiment, selecting the band 304 brings up an overlay that indicates their 19 results within the band 304. In addition, the user may select a preference, either a "like" or a "dislike" that is used to direct the multi-objective optimization as described above in FIG. 1.

Figure 4:
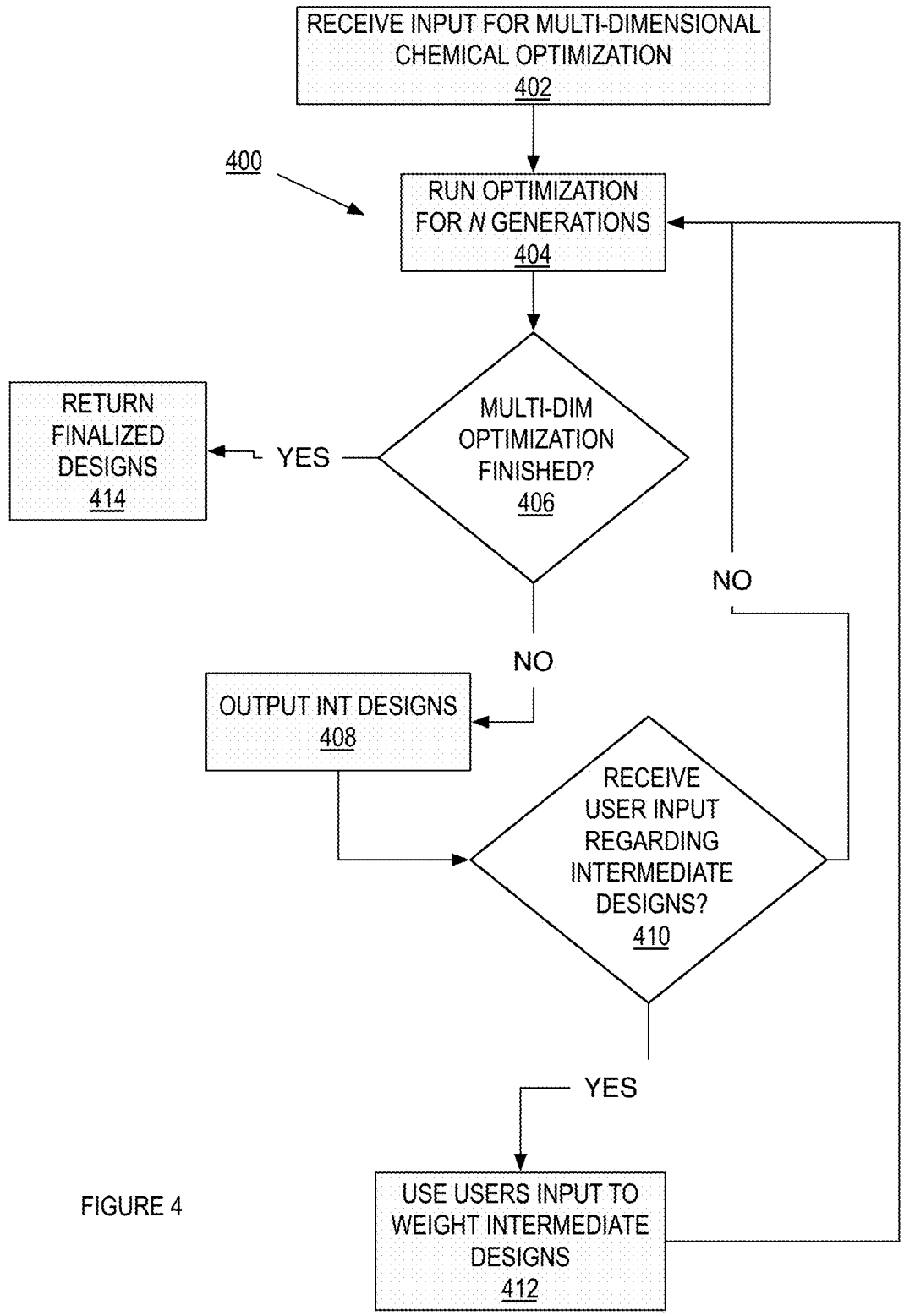
FIG. 4 is a flowchart of one embodiment of a process to allow a user to prefer and/or dislike intermediate designs during an optimization.

FIG. 4 is a flowchart of one embodiment of a process 400 to allow a user to prefer and/or dislike intermediate designs during an optimization. In one embodiment, process 400 is performed by multi-objective optimization module to incorporate user preference indicators into a multi-objective optimization, such as multi-objective optimization module 108 as described above in FIG. 1. In FIG. 4, process 400 begins receiving input for the multi-objective optimization at block 402. In one embodiment, the input received by process 400 is the input variables, target variables, bounds on the target variables (e.g., acceptable lower and upper bounds for one or more of the target variables, and/or a target for one or more of the target variables), which programs or algorithms to use to calculate values for each variable and design, and any other types of inputs (e.g., an initial target molecule), In one embodiment, the target variables are the objectives, or goals, of the multi-objective optimization. In another embodiment, the input can include one or more of: algorithm or workflow to generate a design and evaluate the objectives; how to mutate a particular design; whether the process will "mate" good designs to create a new generation; how many designs to mutate; whether to create completely new in each generation; other types of input; and/or combination thereof.

For example and in one embodiment, the input can be to doing optimization over the variables melting point, toxicity, and protein affinity, where program one is used to calculate the melting point, program two is used to calculate the toxicity, and program three is used to calculate the protein affinity.

At block 404, process 400 runs the multi-objective optimization for N generations. In one embodiment, the number of generations generated can be one or a value larger (e.g. 10, 100, or another value). In this embodiment, the intermediate designs include the variable values and molecules associated with these intermediate designs. Process 400 determines if the multi-objective optimization has finished at block 406. In one embodiment, the optimization completes if the optimization is converged (e.g., reached a threshold) or has reached a maximum generation value. If the multi-objective optimization has finished, at block 414, process 400 returns the finalized designs. In one embodiment, process 400 sends the finalized set of designs to the browser.

If the multi-objective optimization is not finished, process 400 sends the intermediate designs to a client browser at block 408, where the client browser presents these intermediate designs to the user. In one embodiment, process 400 sends the intermediate designs to the client browser 104 as described in FIG. 1 above. Process 400 determines if it has received user input regarding the intermediate designs at block 410. In one embodiment, as described above in FIG. 1, process 400 may receive a "like" or "dislike" for one or more of the intermediate designs sent to the browser as described in block 406 above. In one embodiment, the user input may be about a design that is in a set of designs which is one or more generations old. For example and in one embodiment, the user input could be regarding a design that is part of a set of designs that are ten, twenty, or a hundred generations old. In this example, process 400 would use this user input to incorporate the user preference (e.g., "like" or "dislike") into generating a new set of designs at block 412 below. In one embodiment, process 400 does not wait for user input after generating a new generation of designs. In this embodiment, by not waiting for the user input, process 400 can explore more of the possible design space while the user is evaluating the previous generations of designs.

If no user input is received at block 410, execution proceeds to block 404 above. If there is user input received, process 400 uses the user input to weight the intermediate designs at block 412. As described above with reference to FIG. 1, the user input can be a "like" or a "dislike" indication for a particular design or family of designs. If the user input is a "like" for a design(s), process 400 increases the weight for those design(s). For example and in one embodiment, process 400 can increase the weight for the indicated design(s) by 50% or some other positive factor. If the user input is a "dislike" for a design(s), process 400 decreases the weight for those design(s). For example and in one embodiment, process 400 can decrease the weight for the indicated design(s) by 50%, some other positive factor, or even set the weight to 0. In another embodiment, process 400 can put the liked or disliked on a Pareto surface. In this embodiment, a "liked" design can be added to a Pareto surface, whereas a disliked design can be removed form the Pareto surface. In one embodiment, a Pareto surface is a set of designs that involve the best tradeoffs between objectives. In this embodiment, if there is a structure with strength and weight as two objectives, process 400 may produce a Pareto surface representing designs that are very strong and very heavy, designs that are very weak but very light, and designs with a better tradeoff between the two (for example and in one embodiment, designs that are a bit heavier but very strong!). In this embodiment, process 400 does not choose one of the designs and instead allows for a user's input to the choose the preferred design.

Adding or removing a design from a Pareto surface is a way to encourage or discourage a design. In another embodiment, the liked or disliked signal for a design can be a signal to process 400 to try and find better versions of that design by changing some of the inputs, such as searching around that design. Weighting the design(s) is further described in FIG. 5 below. Execution proceeds to block 404 above. In FIG. 4, process 400 can potentially output multiple different sets of intermediate designs and/or receive user inputs for one or more presented intermediate designs. This allows the user to direct the multi-objective optimization and guide the areas explored by the multi-objective optimization to designs the user would like to be investigated.

Figure 5:
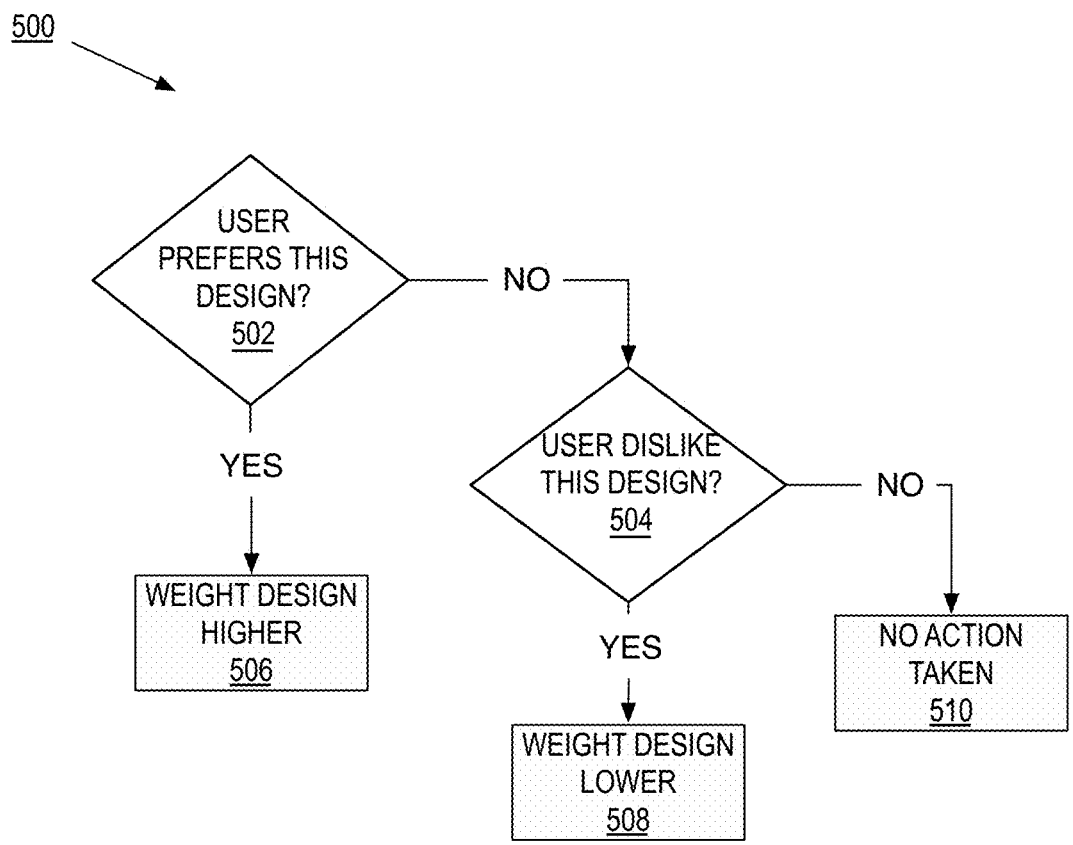
FIG. 5 is a flowchart of one embodiment of a process to weight a design higher or lower if an intermediate design is liked or disliked.

FIG. 5 is a flowchart of one embodiment of a process 500 to weight a design higher or lower if an intermediate design is liked or disliked. In one embodiment, process 400 is performed by user input module to incorporate user preference indicators into a multi-objective optimization, such as user input module 110 as described above in FIG. 1. In FIG. 5, process 500 begins by determining if the user "likes" this design at block 502. In one embodiment, the user can indicate that a particular design is "liked" by the user by selecting that design and indicating this preference through the browser as described above in FIG. 1. If the user "likes" this design, at block 506 process 500 weights this design higher. For example in one embodiment, the user may like a design with a particular functional group in a molecule. In one embodiment, process 500 weights this design higher by increasing the weight associated with that design. For example and in one embodiment, process 500 can increase the weight for the indicated designs by 50% or some other positive factor. If the user does not like this design, process 500 determines if the user "disliked" this design at block 504. If the user dislikes this design, at block 508, process 500 weights this design lower. For example and in one embodiment the user may dislike a design with particular functional group in a molecule, because the user knows this functional group is difficult to synthesize for these types of molecules. In one embodiment, process 500 weights this design lower by decreasing the weight associate with that design. For example in one embodiment, process 500 can decrease the weight for the indicated designs by 50%, some other positive factor, or even set that weight to 0. If the user did not dislike that design, at block 510, no action is taken.

Figure 6:
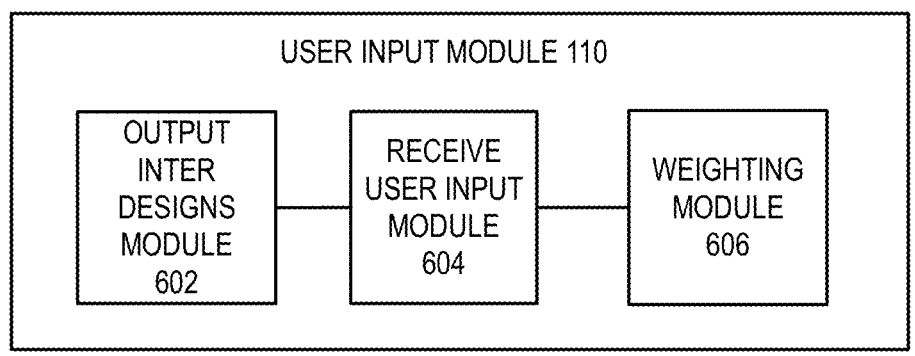
FIG. 6 is a block diagram of one embodiment of a user input module that allows a user to like and/or dislike intermediate designs during an optimization.

FIG. 6 is a block diagram of one embodiment of a user input module 110 that allows a user to prefer and/or dislike intermediate designs during an optimization. In one embodiment, the user input module 110 includes an output intermediate designs module 602, receive user input module 604, and weighting module 606. In one embodiment, the output intermediate designs module 602 output the intermediate designs as described in FIG. 4, block 408 above. The receive user input module 604 receives the user input for the intermediate designs as described in FIG. 4, block 410 above. The weighting module 606 weights the intermediate designs as described in FIG. 4, block 412 above.

Figure 7:
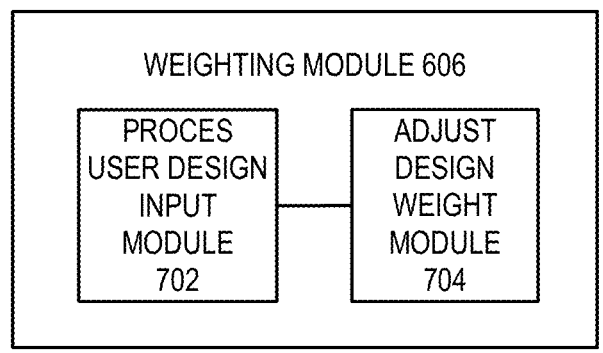
FIG. 7 is a block diagram of one embodiment of a weighting module to weight preferred or disliked intermediate designs during an optimization.

FIG. 7 is a block diagram of one embodiment of a weighting module 606 to weight preferred or disliked intermediate designs during an optimization. In one embodiment, the weighting module 606 includes a process user input module 702 and adjust design weight module 704. In one embodiment, the process user input module 702 if the user "liked" or "disliked" the intermediate design as described in FIG. 5, blocks 502 and 506 above. The adjust design weight module 704 adjusts the weight of the design as described in FIG. 5, blocks 504 and 508.

Figure 8:
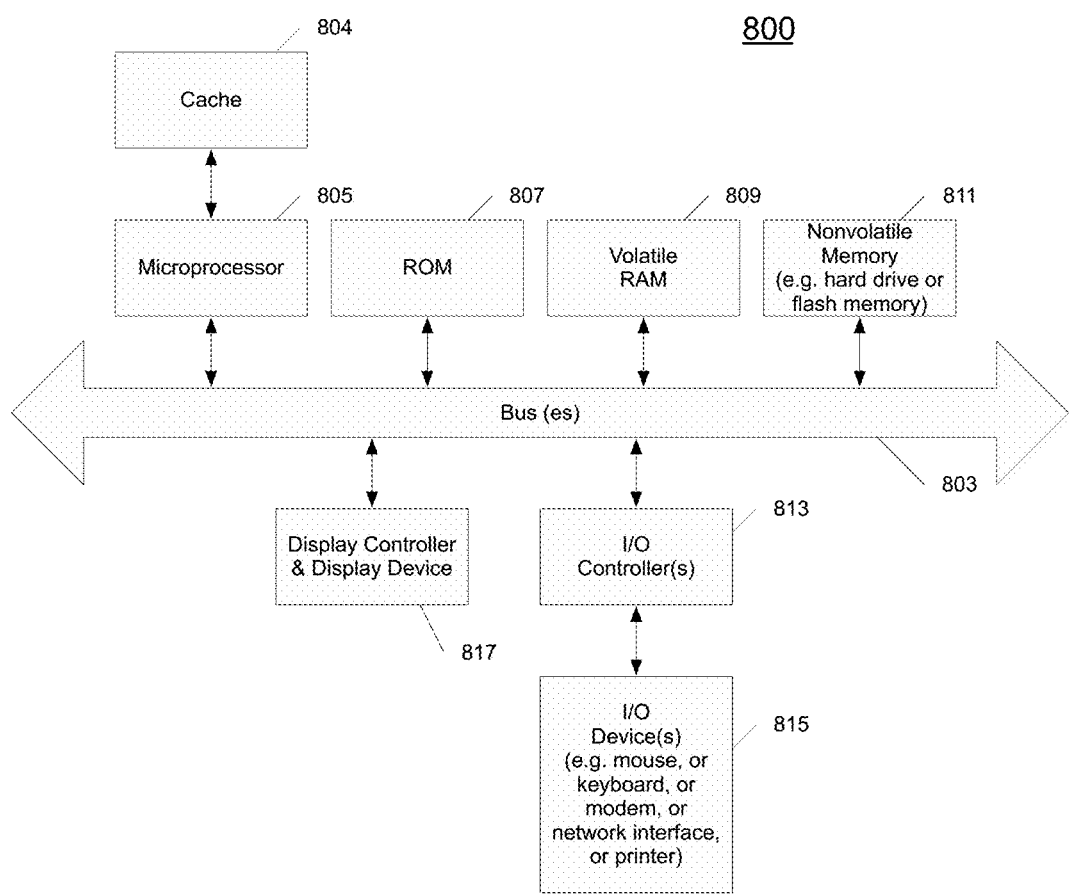
FIG. 8 shows an example of a data processing system, which may be used with one embodiment of the present invention.

FIG. 8 shows one example of a data processing system 800, which may be used with one embodiment of the present invention. For example, the system 800 may be implemented including a client device 102 or server 106 as shown in FIG. 1. Note that while FIG. 8 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 8, the computer system 800, which is a form of a data processing system, includes a bus 803 which is coupled to a microprocessor(s) 805 and a ROM (Read Only Memory) 807 and volatile RAM 809 and a non-volatile memory 811. The microprocessor 805 may include one or more CPU(s), GPU(s), a specialized processor, and/or a combination thereof. The microprocessor 805 may retrieve the instructions from the memories 807, 809, 811 and execute the instructions to perform operations described above. The bus 803 interconnects these various components together and also interconnects these components 805, 807, 809, and 811 to a display controller and display device 813 and to peripheral devices such as input/output (I/O) devices which may be mice, keyboards, modems, network interfaces, printers and other devices which are well known in the art. Typically, the input/output devices 815 are coupled to the system through input/output controllers 813. The volatile RAM (Random Access Memory) 809 is typically implemented as dynamic RAM (DRAM), which requires power continually in order to refresh or maintain the data in the memory.

The mass storage 811 is typically a magnetic hard drive or a magnetic optical drive or an optical drive or a DVD RAM or a flash memory or other types of memory systems, which maintain data (e.g. large amounts of data) even after power is removed from the system. Typically, the mass storage 811 will also be a random access memory although this is not required. While FIG. 8 shows that the mass storage 811 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "performing," "generating," "outputting," "receiving," "computing," "sending," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to incorporate a user preference into a multi-objective optimization while the multi-objective optimization is running, the method comprising:
performing the multi-objective optimization by,
generating a first plurality of intermediate designs based on optimizing a plurality of variable values corresponding to the multiple dimensions of the multi-objective optimization, wherein each of the first plurality of intermediate designs includes a corresponding weight,
outputting the first plurality of intermediate designs, wherein the first plurality of intermediate designs are presented in a user interface to a user concurrently with the multi-objective optimization generating additional intermediate designs,
receiving a preference indicator for a selected one of the first plurality of intermediate designs, the preference indicator inputted by the user through the user interface concurrently with the multi-objective optimization generating additional intermediate designs, wherein at least some of the additional intermediate designs are at least two design generations ahead of the selected one of the first plurality of intermediate design,
adjusting the corresponding weight of the selected one of the first plurality of intermediate designs based on the preference indicator, and
generating a second plurality of intermediate designs using at least the some of the additional designs and the adjusted corresponding weight of the selected one of the first plurality of intermediate designs, wherein a design with a greater weight will have a greater number of mutations generated in the second plurality of intermediate designs than a design with a lower weight.

2. The non-transitory machine-readable medium of claim 1, wherein the corresponding weight is increased if the preference indicator is a like.

3. The non-transitory machine-readable medium of claim 2, wherein the second plurality of intermediate designs includes a design that is a mutation of the selected one of the first plurality of intermediate designs.

4. The non-transitory machine-readable medium of claim 2, wherein the second plurality of intermediate designs does not include a design that is a mutation of the selected one of the first plurality of intermediate designs.

5. The non-transitory machine-readable medium of claim 1, wherein the corresponding weight is decreased if the preference indicator is a dislike.

6. The non-transitory machine-readable medium of claim 1, wherein the outputted first plurality of intermediate designs is received by a client and the client presents the first plurality of intermediate designs in the user interface as a representation of the first plurality of intermediate designs versus a plurality of variable values corresponding to the multiple dimensions of the multi-objective optimizations.

7. The non-transitory machine-readable medium of claim 6, wherein the representation is an X-Y chart of two variable values versus the first plurality of intermediate designs.

8. The non-transitory machine-readable medium of claim 6, wherein the chart is a parallel coordinate chart of more than two variable values versus the first plurality of intermediate designs.

9. The non-transitory machine-readable medium of claim 1, further comprising:
generating a third plurality of intermediate designs from the second plurality of intermediate designs.

10. The non-transitory machine-readable medium of claim 1, wherein the multi-objective optimization is for a chemical entity.

11. A method to incorporate a user preference into a multi-objective optimization while the multi-objective optimization is running, the method comprising: performing the multi-objective optimization by,
generating a first plurality of intermediate designs based on optimizing a plurality of variable values corresponding to the multiple dimensions of the multi-objective optimization, wherein each of the first plurality of intermediate designs includes a corresponding weight,
outputting the first plurality of it designs, wherein the first plurality of intermediate designs are presented in a user interface to a user concurrently with the multi-objective optimization generating additional intermediate designs,
receiving a preference indicator for a selected one of the first plurality of intermediate designs, the preference indicator inputted by the user through the user interface concurrently with the multi-objective optimization generating additional intermediate designs, wherein at least some of the additional intermediate designs are a least two design generations ahead of the selected one of the first plurality of intermediate design,
adjusting the corresponding weight of the selected one of the first plurality of intermediate designs based on the preference indicator, and
generating a second plurality of intermediate designs using at least the some of the additional designs and the adjusted corresponding weight of the selected one of the first plurality of intermediate designs, wherein a design with a greater weight will have a greater number of mutations generated in the second plurality of intermediate designs than a design with a lower weight.

12. The method of claim 11, wherein the corresponding weight is increased if the preference indicator is a like.

13. The method of claim 11, wherein the second plurality of intermediate designs includes a design that is a mutation of the selected one of the first plurality of intermediate designs.

14. The method of claim 11, wherein the corresponding weight is decreased if the preference indicator is a dislike.

15. The method of claim 11, wherein the second plurality of intermediate designs does not include a design that is a mutation of the selected one of the first plurality of intermediate designs.

16. The method of claim 11, wherein the outputted first plurality of intermediate designs is received by a client and the client presents the first plurality of intermediate designs in the user interface as a representation of the first plurality of intermediate designs versus a plurality of variable values corresponding to the multiple dimensions of the multi-objective optimizations.

17. The method of claim 16, wherein the representation is an X-Y chart of two variable values versus the first plurality of intermediate designs.

18. The method of claim 16, wherein the chart is a parallel coordinate chart of more than two variable values versus the first plurality of intermediate designs.

19. The method of claim 11, further comprising:
generating a third plurality of intermediate designs from the second plurality of intermediate designs.

20. A device that incorporates a user preference into a multi-objective optimization while the multi-objective optimization is running, the device comprising:
a processor;
a memory coupled to the processor through a bus; and
a process executed from the memory by the processor that causes the processor to perform the multi-objective optimization, wherein the process further causes the processor to generate a first plurality of intermediate designs based on optimizing a plurality of variable values corresponding to the multiple dimensions of the multi-objective optimization, wherein each of the first plurality of intermediate designs includes a corresponding weight, output the first plurality of intermediate designs, wherein the first plurality of intermediate designs are presented in a user interface to a user concurrently with the multi-objective optimization generating additional intermediate designs, receive a preference indicator for a selected one of the first plurality of intermediate designs, the preference indicator inputted by the user through the user interface concurrently with the multi-objective optimization generating additional intermediate designs, wherein at least some of the additional it designs are at least two design generations ahead of the selected one of the first plurality of intermediate design, adjust the corresponding weight of the selected one of the first plurality of intermediate designs based on the preference indicator, and generate a second plurality of intermediate designs using at least the some of the additional designs and the adjusted corresponding weight of the selected one of the first plurality of intermediate designs, wherein a design with a greater weight will have a greater number of mutations generated in the second plurality of intermediate designs than a design with a lower weight.

21. The device of claim 20, wherein the corresponding weight is increased if the preference indicator is a like.

* * * * *